US012037968B1

(12) United States Patent
Faied et al.

(10) Patent No.: US 12,037,968 B1
(45) Date of Patent: Jul. 16, 2024

(54) VEHICLE FUEL SYSTEM WITH ACTIVE ACCUMULATOR

(71) Applicant: FCA US LLC, Auburn Hills, MI (US)

(72) Inventors: Louai Faied, Rochester Hills, MI (US); John M Lebar, Southfield, MI (US); Ethan M English, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 3 days.

(21) Appl. No.: 18/158,520

(22) Filed: Jan. 24, 2023

(51) Int. Cl.
*F02M 69/46* (2006.01)
*F02D 41/32* (2006.01)
*F02M 37/08* (2006.01)
*F02M 69/54* (2006.01)

(52) U.S. Cl.
CPC ........... *F02M 69/462* (2013.01); *F02D 41/32* (2013.01); *F02M 69/54* (2013.01); *F02D 2200/021* (2013.01); *F02D 2200/0414* (2013.01); *F02D 2200/0602* (2013.01); *F02D 2250/31* (2013.01); *F02M 2037/087* (2013.01)

(58) Field of Classification Search
CPC ................. F02M 69/462; F02M 69/54; F02M 2037/087; F02D 41/32; F02D 2200/021; F02D 2200/0414; F02D 2200/0602; F02D 2250/31
See application file for complete search history.

(56) References Cited

U.S. PATENT DOCUMENTS 5,678,521 A 10/1997 Thompson et al.
6,234,128 B1 5/2001 Reuss
7,066,152 B2 6/2006 Stroia et al.
7,267,108 B2 9/2007 Barylski et al.
8,225,606 B2 7/2012 McBride et al.
(Continued)

FOREIGN PATENT DOCUMENTS

JP 0816672 A2 * 1/1998 ............. F02M 59/06
JP 0964150 A2 * 12/1999 ............. F02M 59/34

OTHER PUBLICATIONS

Machine Translation of EP 0964150 A2 PDF File Name: "EP0964150A2_Machine_Translation.pdf".*
(Continued)

*Primary Examiner* — Grant Moubry
*Assistant Examiner* — Ruben Picon-Feliciano
(74) *Attorney, Agent, or Firm* — Jeremy J. Klobucar

(57) ABSTRACT

A fuel delivery system for a vehicle having an engine includes a fuel injection system, a fuel supply line configured to supply fuel from to the fuel injection system, and a fuel pressure sensor. An active expansion chamber (AEC) accumulator is fluidly coupled to the fuel supply line and includes a housing defining an interior chamber and an adjustable expansion chamber, a plunger assembly separating the interior chamber and the adjustable expansion chamber, and an actuator configured to selectively move the plunger assembly to actively adjust a volume of the adjustable expansion chamber. A controller is configured to detect a pressure change condition in the fuel delivery system and, in response, automatically adjust the volume of the adjustable expansion chamber to maintain the pressure of the fuel delivery system below a predetermined threshold to thereby facilitate preventing fuel leakage at the fuel injectors when the engine is shut off.

11 Claims, 4 Drawing Sheets

(56) References Cited

U.S. PATENT DOCUMENTS

| | | | |
|---|---|---|---|
| 8,277,205 | B2 | 10/2012 | Mellet et al. |
| 9,352,743 | B2 | 5/2016 | Davis et al. |
| 9,593,653 | B2 | 3/2017 | Pursifull et al. |

OTHER PUBLICATIONS

Machine Translation of EP 0816672 A2 PDF File Name: "EP0816672A2_Machine_Translation.pdf".*

* cited by examiner

VEHICLE FUEL SYSTEM WITH ACTIVE ACCUMULATOR

FIELD

The present application relates generally to internal combustion engines and, more particularly, to a fuel system with an active expansion chamber accumulator for an internal combustion engine.

BACKGROUND

Internal combustion engines have traditionally utilized port fuel injection (PFI) fuel delivery technology. PFI engines mix fuel and air in an intake port before the mixture is drawn into the engine cylinders for combustion. This mixing is performed to optimize the combustion and improve engine performance. After engine shut off, residual pressure may build in the fuel lines, which can potentially lead to increased evaporative (EVAP) emissions due to fuel leakage through the injector tips, or hot restart issues due to fuel boiling and increasing pressure in the fuel rail. Known solutions include hydrocarbon absorbers (HCAs), which can be costly and inconvenient because they rely on external hardware. Thus, while such systems work well for their intended purpose, it is desirable to provide continuous improvement in the relevant art.

SUMMARY

According to one example aspect of the invention, a fuel delivery system for a vehicle having an internal combustion engine is provided. In one example implementation, the fuel delivery system includes a fuel injection system including a fuel rail and plurality of fuel injectors configured to supply fuel to the engine, a fuel supply line configured to supply fuel from a fuel tank to the fuel injection system, and a fuel pressure sensor configured to sense a pressure in the fuel delivery system. An active expansion chamber (AEC) accumulator is fluidly coupled to the fuel supply line and includes a housing defining an interior chamber and an adjustable expansion chamber, a plunger assembly separating the interior chamber and the adjustable expansion chamber, and an actuator configured to selectively move the plunger assembly to actively adjust a volume of the adjustable expansion chamber. A controller is in signal communication with the AEC accumulator and the fuel pressure sensor and is configured to detect a pressure change condition in the fuel delivery system and, in response to the detected pressure change condition, automatically adjust the volume of the adjustable expansion chamber to maintain the pressure of the fuel delivery system below a predetermined threshold to thereby facilitate preventing fuel leakage at the fuel injectors when the engine is shut off.

In addition to the foregoing, the described fuel delivery system may include one or more of the following features: wherein the AEC accumulator plunger assembly includes a hub, a lead screw threadably engaged with the hub, and a plunger coupled to the hub; wherein the plunger includes a circumferential recess receiving a seal, wherein the seal is in sealing arrangement between the plunger and an interior wall of the housing; wherein the actuator is a motor with an output shaft coupled to the lead screw; wherein the AEC accumulator housing includes an upper housing coupled to a lower housing; and wherein the lower housing includes an inlet port and an outlet port coupled to the fuel supply line.

In addition to the foregoing, the described fuel delivery system may include one or more of the following features: an engine coolant temperature sensor, an intake air temperature sensor, and an ambient air temperature sensor; wherein the controller is programmed to receive one or more signals from the engine coolant temperature sensor, the intake air temperature sensor, and the ambient air temperature sensor, based on the received one or more signals, model a pressure rise in the fuel rail, and based on the modeled pressure rise, automatically adjust the volume of the adjustable expansion chamber to maintain the pressure of the fuel delivery system below the predetermined threshold to thereby facilitate preventing fuel leakage at the fuel injectors; and wherein the controller only adjusts the volume of the adjustable expansion chamber when the vehicle engine is off.

According to another example aspect of the invention, a method of monitoring and controlling a fuel delivery system of a vehicle having an internal combustion engine, the fuel delivery system including a fuel injection system having a fuel rail and plurality of fuel injectors configured to supply fuel to the engine, a fuel supply line configured to supply fuel from a fuel tank to the fuel injection system, a fuel pressure sensor configured to sense a pressure in the fuel delivery system, and an active expansion chamber (AEC) accumulator having an adjustable expansion chamber fluidly coupled to the fuel supply line is provided. In one example implementation, the method includes monitoring, via a controller, a fuel pressure of the fuel delivery system to detect a pressure change condition in the fuel delivery system, and in response to detecting the pressure change condition, automatically adjusting, via the controller, the volume of the adjustable expansion chamber to maintain the pressure of the fuel delivery system below a predetermined threshold to thereby facilitate preventing fuel leakage at the fuel injectors.

In addition to the foregoing, the described method may include one or more of the following features: receiving, via the controller, one or more signals from an engine coolant temperature sensor, an intake air temperature sensor, and an ambient air temperature sensor, modeling with the controller, based on the received one or more signals, a pressure rise in the fuel rail, and based on the modeled pressure rise, automatically adjusting, via the controller, the volume of the adjustable expansion chamber to maintain the pressure of the fuel delivery system below the predetermined threshold to thereby facilitate preventing fuel leakage at the fuel injectors.

In addition to the foregoing, the described method may include one or more of the following features: wherein the AEC accumulator includes a housing defining an interior chamber and the adjustable expansion chamber, a plunger assembly separating the interior chamber and the adjustable expansion chamber, and an actuator configured to selectively move the plunger assembly to actively adjust a volume of the adjustable expansion chamber; and adjusting, with the controller, the volume of the adjustable expansion chamber only when the vehicle engine is off.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

The present application is generally directed to a monitoring system and active expansion chamber accumulator for a vehicle engine fuel delivery system. The accumulator includes a pressure vessel housing with a moving boundary such as a plunger, which is actuated by an electronically controllable actuator such as a motor or linear actuator to vary of a volume of the pressure vessel. The combination of the stationary and movable elements allows for an active expansion chamber. In the example embodiment, the chamber includes an inlet port connected to a fuel tank, and an outlet port connected to an fuel injection system. The change in chamber volume is actively controlled to reduce fuel line pressure after the engine is shut off.

Figure 1:
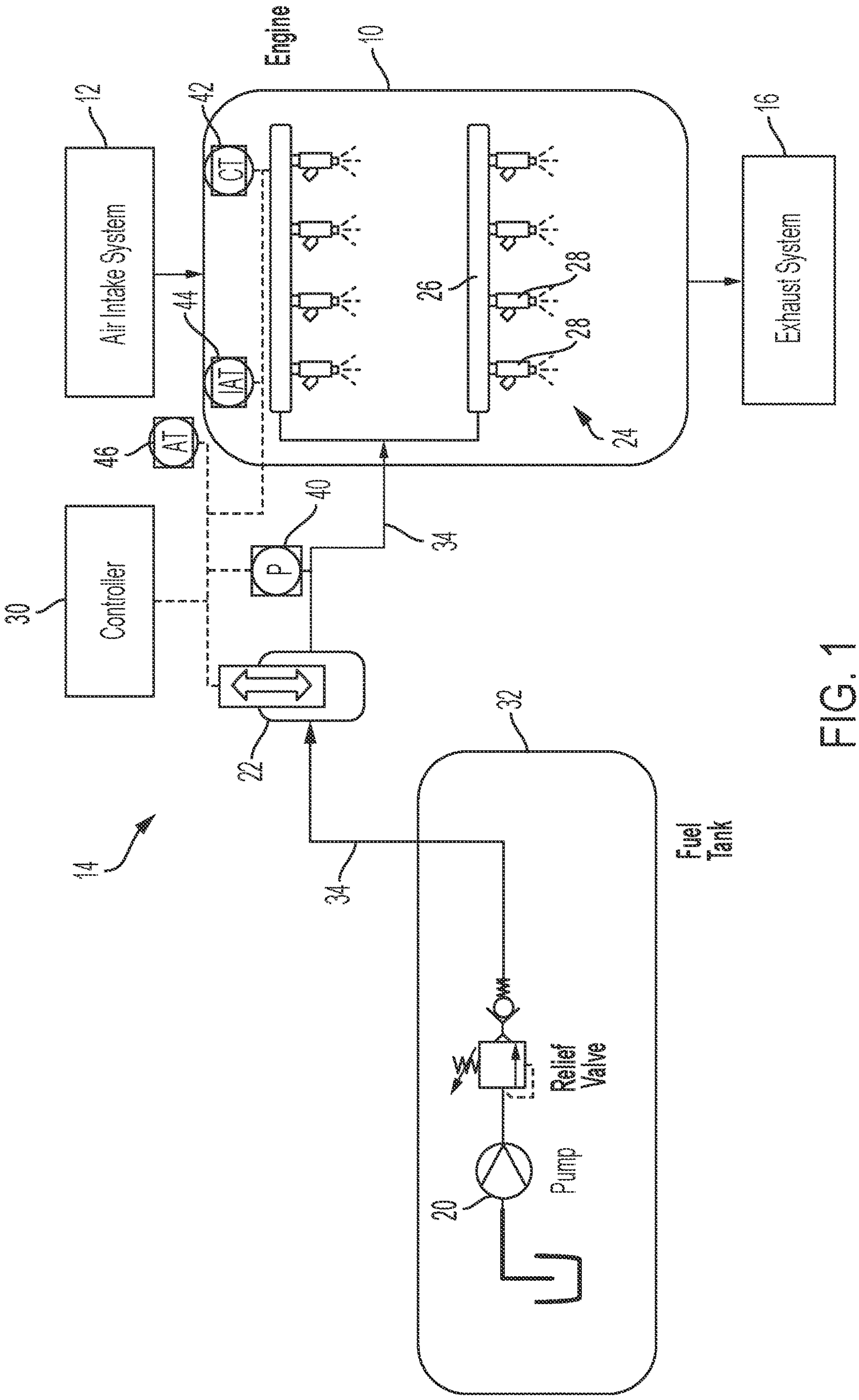
FIG. 1 is a schematic illustration of an engine and fuel delivery system in accordance with the principles of the present disclosure.

With initial reference to FIG. 1, an example internal combustion engine for a vehicle is illustrated and generally identified at reference numeral 10. The internal combustion engine 10 generally includes an air induction system 12, a fuel delivery system 14, and an exhaust system 16. Although not shown, the engine 10 includes a cylinder head and block defining one or more cylinders each receiving a reciprocating piston therein. Air and fuel are respectively supplied to combustion chambers of the cylinders via the air induction system 12 and the fuel delivery system 14. The air/fuel mixture is ignited in the combustion chamber and the resulting combustion gas is directed from the combustion chamber to the exhaust system 16.

In the example embodiment, the fuel delivery system 14 generally includes a low pressure fuel pump 20, an active expansion chamber (AEC) accumulator 22, and a fuel injection system 24 (e.g., PFI, GDI, PDI), which includes a fuel rail 26 and a plurality of fuel injectors 28. In the example embodiment, the fuel delivery system 14 is configured to be monitored and controlled by a controller such as, for example, an engine control unit (ECU) 30, which is in signal communication with the fuel pump 20, the AEC accumulator 22, and the fuel injection system 24.

The low pressure fuel pump 20 is disposed within a fuel tank 32 and is configured to supply fuel from the fuel tank 32 to a main fuel supply line 34. As illustrated, the main fuel supply line 34 is fluidly connected to the AEC accumulator 22 and subsequently supplies fuel to the fuel pressure rail 26 and fuel injectors 28. In this way, the fuel injectors 28 are configured to supply fuel to the intake ports or combustion chamber where the fuel is mixed with air from the air induction system 12 for subsequent combustion.

In the example embodiment, the ECU 30 is in signal communication with one or more sensors to receive one or more signals for operation of the fuel delivery system 14. In the illustrated example, the ECU 30 is in signal communication with a fuel pressure sensor 40, an engine coolant temperature sensor 42, an intake air temperature sensor 44, and a vehicle mounted ambient air temperature sensor 46. The fuel pressure sensor 40 is located on the main fuel supply line 34 downstream of the AEC accumulator 22 and is configured to sense a fuel pressure on the fuel supply line 34 between the AEC accumulator 22 and the fuel injectors 28 (e.g., in fuel rail 26). The engine coolant temperature sensor 42 is configured to sense a temperature of coolant configured to cool engine 10, the intake air temperature sensor 44 is configured to sense a temperature of air supplied by the air induction system 12, and the ambient air temperature sensor 46 is configured to sense a temperature of the ambient air.

Figure 2:
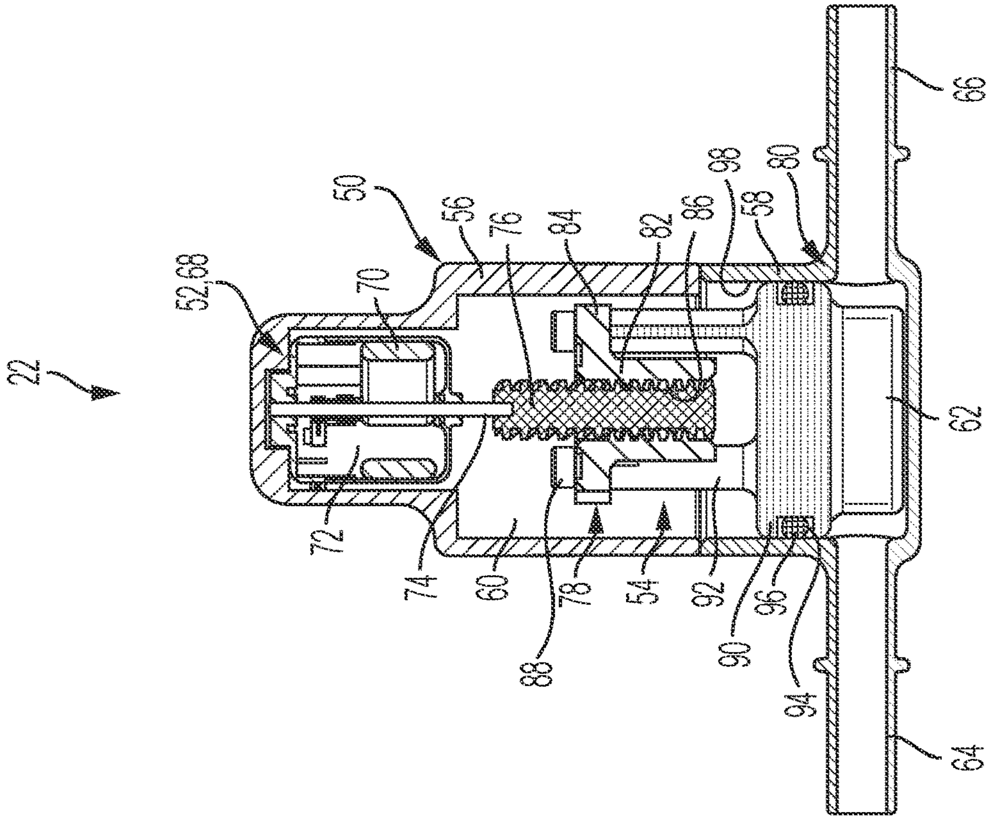
FIG. 2 illustrates example active expansion chamber accumulator of the fuel delivery system shown in FIG. 1, in a decreased volume state, in accordance with the principles of the present disclosure.
Figure 3:
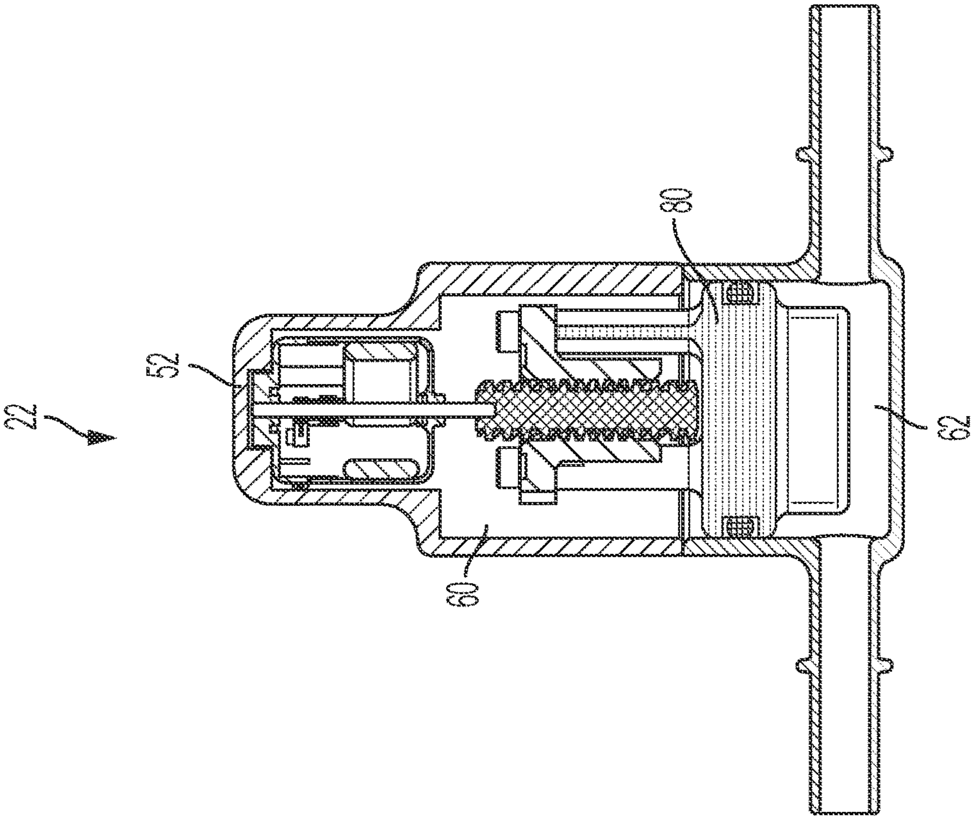
FIG. 3 illustrates example active expansion chamber accumulator of the fuel delivery system shown in FIG. 1, in an increased volume state, in accordance with the principles of the present disclosure.

With reference now to FIGS. 2 and 3, the AEC accumulator 22 will be described in more detail. The AEC accumulator 22 is configured to actively (as opposed to passively) adjust a volume of the fuel system 14 to decrease residual fuel pressure when the engine is shut off or immediately prior to start, to thereby prevent fuel injector tip leakage and provide fuel rail pressure consistency during hot starts. In one example, the ECU 30 may monitor the fuel pressure sensor 40 to detect a pressure change condition in the fuel system 14, and automatically control the AEC accumulator 22 to adjust a volume of the fuel system to prevent the leakage.

In the illustrated example, the AEC accumulator 22 generally includes a housing 50, an actuator 52, and a plunger assembly 54. The housing 50 includes an upper housing 56 and a lower housing 58 defining an interior chamber 60 and an adjustable expansion chamber 62. The upper housing 56 partially defines the interior chamber 60, which houses the actuator 52 and at least a portion of the plunger assembly 54. The lower housing 58 is removably coupled to the upper housing 56 (e.g., via fasteners, not shown) and defines the expansion chamber 62 and a portion of the interior chamber 60. The lower housing 58 includes an inlet port 64 and an outlet port 66 configured to fluidly couple to the main fuel supply line. The inlet port 64 is configured to receive a flow of fuel from the fuel pump 20, and the outlet port 66 is configured to supply the flow of fuel to the fuel injection system 24.

In the example embodiment, the actuator 52 is a motor 68 having a stator 70 and a rotor 72 configured to selectively rotate an output shaft 74. However, it will be appreciated that actuator 52 may be any suitable type of actuator that enables the AEC accumulator to function as described herein.

In the example implementation, the plunger assembly 54 generally includes a lead screw 76, a hub 78, and a plunger 80. The lead screw 76 is coupled to the actuator output shaft 74 and configured for rotation therewith. The lead screw 76 is threadably engaged with the hub 78, which includes a main body 82 and a flange 84 extending therefrom. The main body 82 defines a threaded axial bore 86 configured to receive the lead screw 76. The flange 84 includes one or more apertures (not shown) configured to each receive a fastener 88 (e.g., bolt, screw) for coupling to the plunger 80. As illustrated, the plunger 80 includes a main body 90 and one or more arms 92 extending upwardly therefrom. The main body 90 is configured to separate and seal the interior chamber 60 from the expansion chamber 62. As illustrated, the main body 90 includes an outer perimeter or circumferential recess 94 configured to receive a sealing member 96 (e.g., O-ring) therein. The sealing member 96 is configured to seal between the plunger main body 90 and an inner surface 98 of the lower housing 58. The one or more arms 92 are configured to extend outwardly from the plunger main body 90 and are configured to couple to the hub 78, for example, via fasteners 88.

In an example operation, the ECU 30 is configured to control actuator 52 to selectively rotate the output shaft 74 and lead screw 76 in a clockwise or counter clockwise direction. In this way, via the threaded engagement between the lead screw 76 and hub 78, the rotation either moves the hub 78 in an upward or downward direction (as shown in FIGS. 2 and 3), which correspondingly moves the plunger main body 90. This upward/downward movement of the plunger main body 90 increases or decreases the volume of the expansion chamber 62. For example, FIG. 2 illustrates the plunger assembly 54 in a fully decreased volume position whereby the expansion chamber 62 provides a low volume. FIG. 3 illustrates the plunger assembly 54 in a fully increased volume position whereby the expansion chamber 62 provides an increased volume, for example, to decrease residual fuel line pressure after engine shut off.

Figure 4:
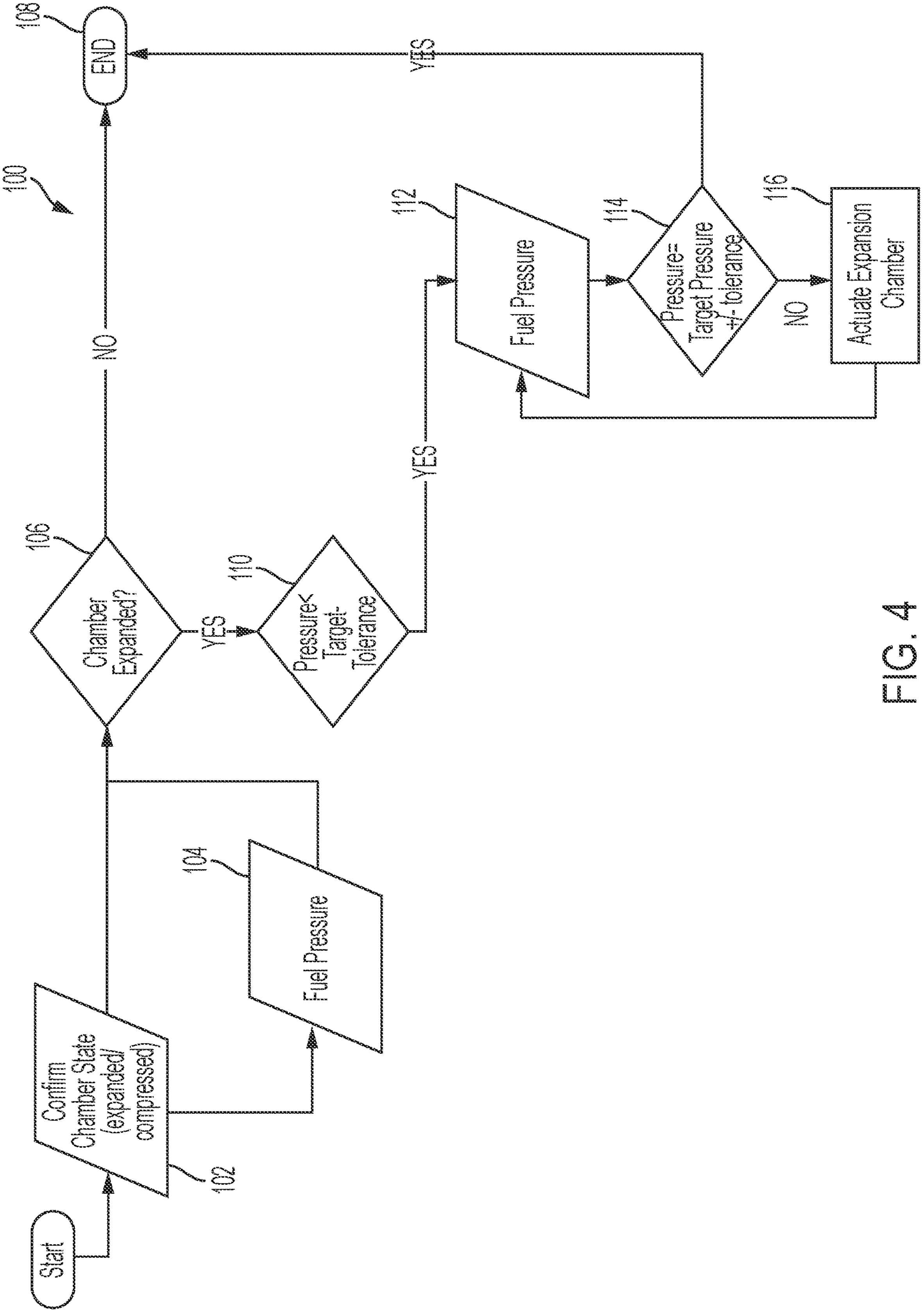
FIG. 4 illustrates a flow control diagram of an example operation of the fuel delivery system of FIG. 1, in accordance with the principles of the present disclosure.

Referring now to FIG. 4, a flow diagram of an example fuel system control method 100 according to the principles of the present disclosure is illustrated. At 102, ECU 30 determines if the AEC accumulator 22 is in an increased volume or decreased volume state/position. At step 104, ECU 30 determines a fuel pressure in the main fuel supply line 34, for example, via one or more signals from fuel pressure sensor 40. At step 106, ECU 30 determines if the expansion chamber 62 volume is increased. If no, control ends at step 108. If yes, at step 110, ECU 30 determines if the determined fuel pressure is less than a predetermined target within a predetermined tolerance.

If yes, at step 112, ECU 30 determines a fuel pressure in the main fuel supply line 34. At step 114, ECU 30 determines if the determined fuel pressure is equal to the predetermined target pressure within a predetermined tolerance. If no, at step 116, ECU 30 actuates the AEC accumulator 22 to increase or decrease the volume of the expansion chamber 62, and control returns to step 112. If the measured fuel pressure equals the predetermined target temperature (within tolerances), control proceeds to step 108 and ends.

Figure 5:
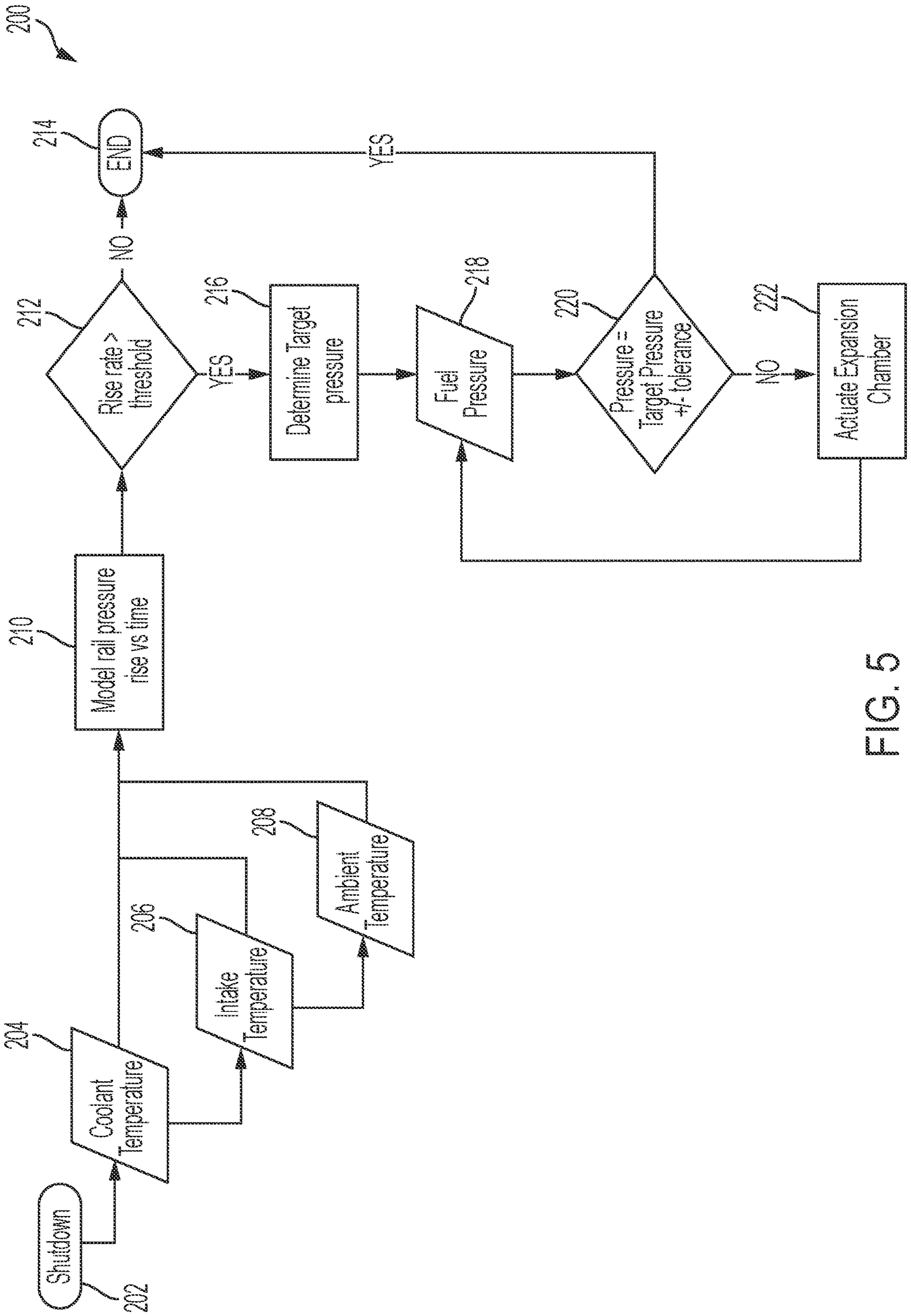
FIG. 5 illustrates a flow control diagram of another example operation of the fuel delivery system of FIG. 1, in accordance with the principles of the present disclosure.

Referring now to FIG. 5, a flow diagram of another example fuel system control method 200 according to the principles of the present disclosure is illustrated. At step 202, the engine is shut down. At step 204, ECU 30 determines a temperature of the engine coolant, for example, via one or more signals from engine coolant temperature sensor 42. At step 206, ECU 30 determines a temperature of intake air, for example, via one or more signals from intake air temperature sensor 44. At step 208, ECU 30 determines an ambient air temperature, for example, via one or more signals from ambient air temperature sensor 46.

At step 210, ECU 30 determines a modeled rail pressure rise over time, for example, based on one or more of the determined coolant temperature, intake temperature, and ambient air temperature. At step 212, ECU 30 determines if the modeled rail pressure rise rate is greater than a predetermined threshold. If no, control ends at step 214. If yes, at step 216, ECU 30 determines a target pressure based on the determined rail pressure rise rate. At step 218, ECU 30 determines a fuel pressure in the main fuel supply line 34. At step 220, ECU 30 determines if the determined fuel pressure is equal to the predetermined target pressure (e.g., the modeled rail pressure rise) within a predetermined tolerance. If no, at step 222, ECU 30 actuates the AEC accumulator 22 to increase or decrease the volume of the expansion chamber 62 and control returns to 218. If the measured fuel pressure equals the predetermined target temperature (within tolerances), control proceeds to step 108 and ends.

Described herein are systems and methods for a fuel delivery system for an internal combustion engine. The fuel system includes an accumulator with an active expansion chamber configured to vary a volume of the fuel system. Upon engine shut down or immediately prior to start, the chamber volume can be actively increased to thereby increase the volume of the fuel system and decrease pressure therein. The system advantageously alleviates EVAP emission issues by preventing fuel injector tip leakage and decreasing pressure in the fuel rail to facilitate consistency during hot restarts.

It will be appreciated that the term controller or module as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A fuel delivery system for a vehicle having an internal combustion engine, the fuel delivery system comprising:
- a fuel injection system including a fuel rail and fuel injectors configured to supply fuel to the engine;
- a fuel supply line configured to supply fuel from a fuel tank to the fuel injection system;
- a fuel pressure sensor configured to sense a pressure in the fuel delivery system;
- an active expansion chamber (AEC) accumulator fluidly coupled to the fuel supply line and comprising:
  - a housing defining an interior chamber and an adjustable expansion chamber;
  - a plunger assembly separating the interior chamber and the adjustable expansion chamber; and
  - an actuator configured to selectively move the plunger assembly to actively adjust a volume of the adjustable expansion chamber; and
- a controller in signal communication with the AEC accumulator and the fuel pressure sensor, the controller configured to detect a pressure change condition in the fuel delivery system and, in response to the detected pressure change condition, automatically adjust the volume of the adjustable expansion chamber to maintain the pressure of the fuel delivery system below a predetermined threshold to thereby facilitate preventing fuel leakage at the fuel injectors when the engine is shut off, wherein the controller only adjusts the volume of the adjustable expansion chamber when the vehicle engine is off.

2. The fuel delivery system of claim 1, wherein the AEC accumulator plunger assembly comprises:

a hub;

a lead screw threadably engaged with the hub; and a plunger coupled to the hub.

3. The fuel delivery system of claim 2, wherein the plunger includes a circumferential recess receiving a seal, wherein the seal is in sealing arrangement between the plunger and an interior wall of the housing.

4. The fuel delivery system of claim 2, wherein the actuator is a motor with an output shaft coupled to the lead screw.

5. The fuel delivery system of claim 1, wherein the AEC accumulator housing includes an upper housing coupled to a lower housing.

6. The fuel delivery system of claim 5, wherein the lower housing includes an inlet port and an outlet port coupled to the fuel supply line.

7. The fuel delivery system of claim 1, further comprising an engine coolant temperature sensor, an intake air temperature sensor, and an ambient air temperature sensor.

8. The fuel delivery system of claim 7, wherein the controller is programmed to:

receive one or more signals from the engine coolant temperature sensor, the intake air temperature sensor, and the ambient air temperature sensor;

based on the received one or more signals, model a pressure rise in the fuel rail; and based on the modeled pressure rise, automatically adjust the volume of the adjustable expansion chamber to maintain the pressure of the fuel delivery system below the predetermined threshold to thereby facilitate preventing fuel leakage at the fuel injectors.

9. A method of monitoring and controlling a fuel delivery system of a vehicle having an internal combustion engine, the fuel delivery system including a fuel injection system having a fuel rail and fuel injectors configured to supply fuel to the engine, a fuel supply line configured to supply fuel from a fuel tank to the fuel injection system, a fuel pressure sensor configured to sense a pressure in the fuel delivery system, and an active expansion chamber (AEC) accumulator having an adjustable expansion chamber fluidly coupled to the fuel supply line, the method comprising:

monitoring, via a controller, a fuel pressure of the fuel delivery system to detect a pressure change condition in the fuel delivery system; and in response to detecting the pressure change condition, automatically adjusting, via the controller, the volume of the adjustable expansion chamber to maintain the pressure of the fuel delivery system below a predetermined threshold to thereby facilitate preventing fuel leakage at the fuel injectors, wherein the volume of the adjustable expansion chamber is adjusted only when the vehicle engine is off.

10. The method of claim 9, further comprising:

receiving, via the controller, one or more signals from an engine coolant temperature sensor, an intake air temperature sensor, and an ambient air temperature sensor;

modeling with the controller, based on the received one or more signals, a pressure rise in the fuel rail; and based on the modeled pressure rise, automatically adjusting, via the controller, the volume of the adjustable expansion chamber to maintain the pressure of the fuel delivery system below the predetermined threshold to thereby facilitate preventing fuel leakage at the fuel injectors.

11. The method of claim 9, wherein the AEC accumulator comprises: a housing defining an interior chamber and the adjustable expansion chamber;

a plunger assembly separating the interior chamber and the adjustable expansion chamber; and an actuator configured to selectively move the plunger assembly to actively adjust a volume of the adjustable expansion chamber.

* * * * *